(12) United States Patent
Kierska et al.

(10) Patent No.: US 11,360,516 B2
(45) Date of Patent: Jun. 14, 2022

(54) PORTABLE DEVICE FOR PROCESSING, TRANSMITTING, AND RECEIVING INFORMATION, SOUND, AND VIDEO

(71) Applicant: VEDACO SP. Z O.O., Wola Batorska (PL)

(72) Inventors: Izabela Kierska, Cracow (PL); Andrzej Krzysztof Kierski, Cracow (PL)

(73) Assignee: VEDACO SP. Z O.O., Wolta Batorska (PL)

( * ) Notice: Subject to any disclaimer, the term of this patent is extended or adjusted under 35 U.S.C. 154(b) by 0 days.

(21) Appl. No.: 16/967,728

(22) PCT Filed: Feb. 6, 2019

(86) PCT No.: PCT/PL2019/050009
§ 371 (c)(1),
(2) Date: Aug. 6, 2020

(87) PCT Pub. No.: WO2019/156578
PCT Pub. Date: Aug. 15, 2019

(65) Prior Publication Data
US 2021/0041910 A1 Feb. 11, 2021

(30) Foreign Application Priority Data
Feb. 6, 2018 (PL) .......................................... 424515

(51) Int. Cl.
*G06F 1/16* (2006.01)

(52) U.S. Cl.
CPC ............ *G06F 1/165* (2013.01); *G06F 1/1616* (2013.01); *G06F 1/1654* (2013.01)

(58) Field of Classification Search
CPC ...... G06F 1/1647; G06F 1/1649; G06F 1/165; G06F 1/1654
See application file for complete search history.

(56) References Cited

U.S. PATENT DOCUMENTS

| | | | |
|---|---|---|---|
| 6,392,871 B1 * | 5/2002 | Yanase | G06F 1/162 345/905 |
| 6,643,124 B1 | 11/2003 | Wilk | |
| 7,136,282 B1 | 11/2006 | Rebeske | |
| 10,466,750 B2 * | 11/2019 | Lee | G06F 1/1616 |
| 10,936,015 B2 * | 3/2021 | Liu | G06F 1/1675 |
| 2010/0039764 A1 * | 2/2010 | Locker | G06F 1/1669 361/679.29 |
| 2010/0157518 A1 | 6/2010 | Ladouceur et al. | |
| 2013/0181883 A1 * | 7/2013 | Garcia | G06F 1/1647 345/1.1 |
| 2013/0335325 A1 * | 12/2013 | Lee | G06F 3/041 345/161 |

(Continued)

FOREIGN PATENT DOCUMENTS

| CN | 106444971 | 2/2017 |
|---|---|---|
| PL | 325239 A1 | 7/1998 |

*Primary Examiner* — Anthony Q Edwards

(57) ABSTRACT

A device incorporating a keyboard (1) and a display (2), constituting two separate workspaces, with a third movable workspace integrated with the keyboard (1) and the display (2), constituting a work and navigation panel (3). The panel (3) is a touch panel. On the back of the display (2) the device is equipped with an additional screen (4).

6 Claims, 3 Drawing Sheets

(56) References Cited

U.S. PATENT DOCUMENTS

Figure 1:
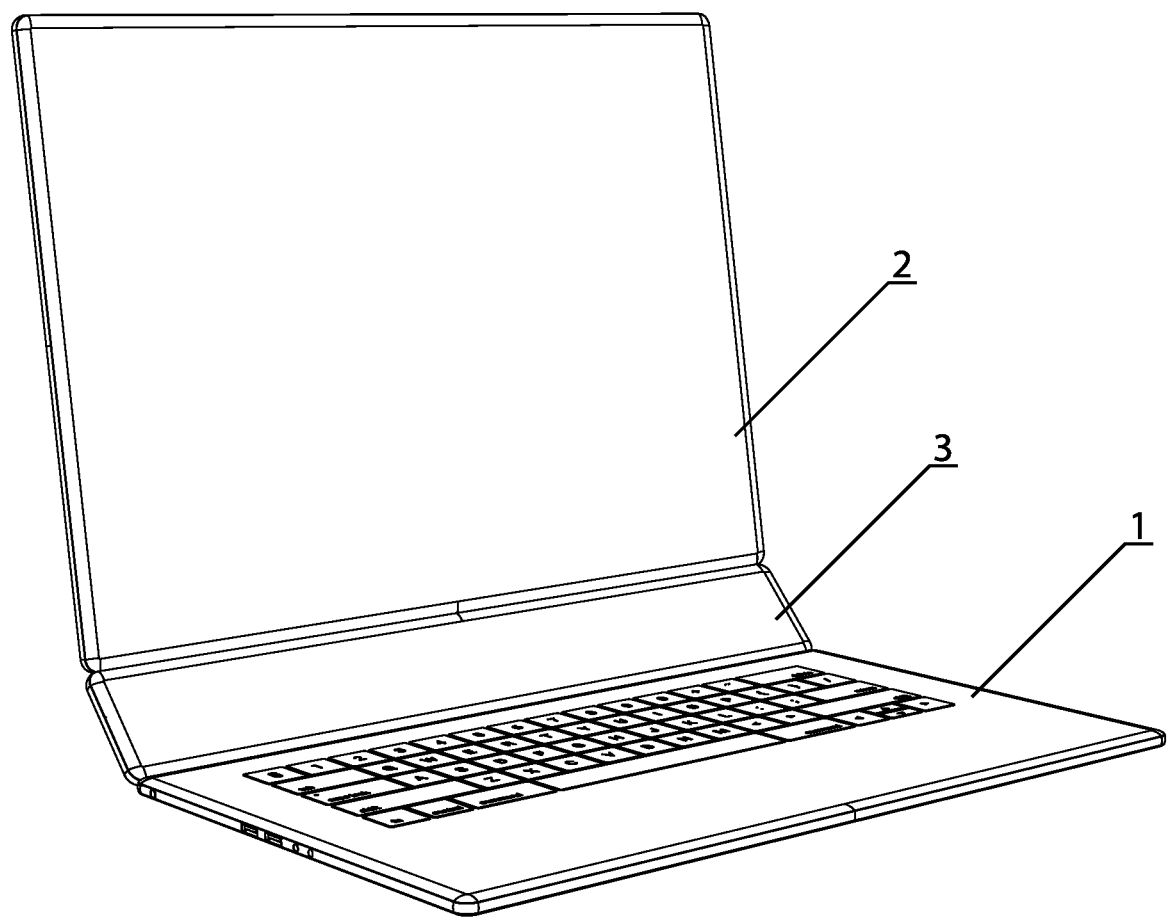

| | | | |
|---|---|---|---|
| 2014/0184904 A1* | 7/2014 | Lam | H04N 5/2252 |
| | | | 348/375 |
| 2016/0091929 A1* | 3/2016 | Kwong | G06F 1/1643 |
| | | | 345/173 |
| 2016/0094691 A1* | 3/2016 | Okuley | H04M 1/0254 |
| | | | 455/575.1 |
| 2016/0274853 A1* | 9/2016 | Kozaczuk | G06F 3/14 |
| 2016/0306385 A1* | 10/2016 | Chen | G06F 1/1616 |
| 2017/0023980 A1 | 1/2017 | Marseille | |
| 2017/0227991 A1 | 8/2017 | Kuscher | |
| 2018/0188774 A1* | 7/2018 | Ent | G06F 1/1669 |
| 2018/0343760 A1* | 11/2018 | Lee | G06F 1/1626 |

* cited by examiner

PORTABLE DEVICE FOR PROCESSING, TRANSMITTING, AND RECEIVING INFORMATION, SOUND, AND VIDEO

The object of the invention is a portable device for processing, transmitting, and receiving information, sound, and video powered from a battery or a fixed power source.

The state of the art knows typical portable devices for processing and transmitting, and receiving information, sound, and images i.e. laptops. Laptops are designed as single, compact, closable devices that contain all internal components (processor, memory, etc.), selected media inputs (DVD-ROM, USB), connectors (HDMI, D-Sub, etc.), devices for communication with the user (keyboard, screen, M and TrackPoint, touchpad). Laptop screen is not wider than 21 inches. Laptops are equipped with internal rechargeable batteries that are sufficient for several hours of device operation without external power.

The advantages of portable computers are their light weight, compact size, and their readiness for use at any location, regardless of the availability of popular power sources. Laptop computers can be expanded. Their functionality can be expanded via PCMCIA and ExpressCard cards (GSM modems (3G-HSDPA). The improvements consists in: lowering the weight of laptops, increasing the performance of the processor and graphics card, increasing RAM, increasing the battery performance, replacing the traditional SATA drive with an SSD drive, or increasing screen resolution and adding the touch display functions. The trend is similar to that of smartphones—laptops are becoming increasingly lighter and thinner.

The state of the art knows, e.g. from Polish application P.429239, a laptop with a swivel connection between the display and the keyboard.

US20117227991 application discloses a laptop with a cover and a base. The cover can be swivel-mounted to the base. The cover between the keyboard and the open part can be configured in a manner that enables it's tilting from the first position to the second position, which covers the keyboard.

Patent application US2017023980 discloses a lid of a laptop with a slidable panel. This panel is capable of sliding outward to the left or right of the laptop to allow for holding paper.

Application CN106444971 discloses a laptop consisting of a main base and a screen pivotally connected to the main unit. The laptop is also characterised in that the front side of the screen is equipped with a photo module.

Furthermore, patent publications US7136282B1, US6643124_81A1 and US2010157518A1 disclose portable devices for processing and transmitting and receiving information, sound and video having a third movable work area integrated with a keyboard and monitor to firm a work and navigation panel.

The purpose of the invention is to extend the operational scope of a laptop by adding a third, mobile work and navigation space and/or a tablet and/or a smartphone.

A portable device for processing, transmitting, and receiving information, sound, and video, containing a keyboard and display that constitute two separate workspaces, equipped with, according to the invention, a third movable workspace. The configuration of the third movable workspace is now discussed in greater detail. The third movable workspace is integrated with the keyboard and the display, forming a work and navigation panel wherein in a collapsed state the third movable workspace forms one surface with the bottom surface of the keyboard, and the sum of the size of the surfaces of the keyboard and the work and navigation panel is equal to the size of the surface of the monitor.

Preferably, the keyboard and the work and navigation panel have different surface sizes.

Preferably, when the display is removed, it is a stand-alone keyboard with the work and navigation panel while maintaining the features of a laptop/computer.

Preferably, the portable device is also equipped with an additional screen on the back of the display.

Preferably, the keyboard with the work and navigation panel are shaped as a single unit or as two connected elements.

Preferably, the third movable workspace constitutes a touch panel.

The new work and navigation area made by moving the keyboard and display away from each other and inserting instead a work panel movably connected with the keyboard and the display raises new operational possibilities of the laptop, significantly increasing the operational scope of the device. In addition to these benefits, the third work and navigation area allows the display to be positioned at the right angle, convenient for the user and causing less eye fatigue. With the movable panel integrated with the keyboard and display and constituting a third work and navigation area, the screen on the back of the display can be easily used when the display is collapsed onto the keyboard. With fully equipped device the screen at the back of the display acts as a tablet or smartphone, while the main screen acts as a laptop. The third work and navigation area is an auxiliary space for any applications, games, utilities, including office software and other software. As the device is made of a single piece of material, this will lower production costs by reducing material consumption and production time. Despite adding the third movable workspace to the device, when collapsed it is still flat and comfortable to carry. The rigid shape of the third movable workspace that constitutes the work and navigation panel makes it easy to arrange the screen in various positions. In standard laptops there are two movable parts movable via contact between the two planes (a hinge mechanism between the keyboard and the display to adjust the angle of the display). The solution according to the invention has three movable parts that use two plane intersections as movement axes. This significantly increases the ability to properly position the laptop display and the tablet display. The removal of the display with screens, thus leaving the keyboard with the work and navigation panel, does not make the device lose its laptop/computer features, while additionally enabling the use of the device for work with, for example, desktop computers or a large desktop monitors.

The changes do not limit the operational scope of existing laptops.

The subject of the invention is depicted in the embodiments, whereas

Figure 2:
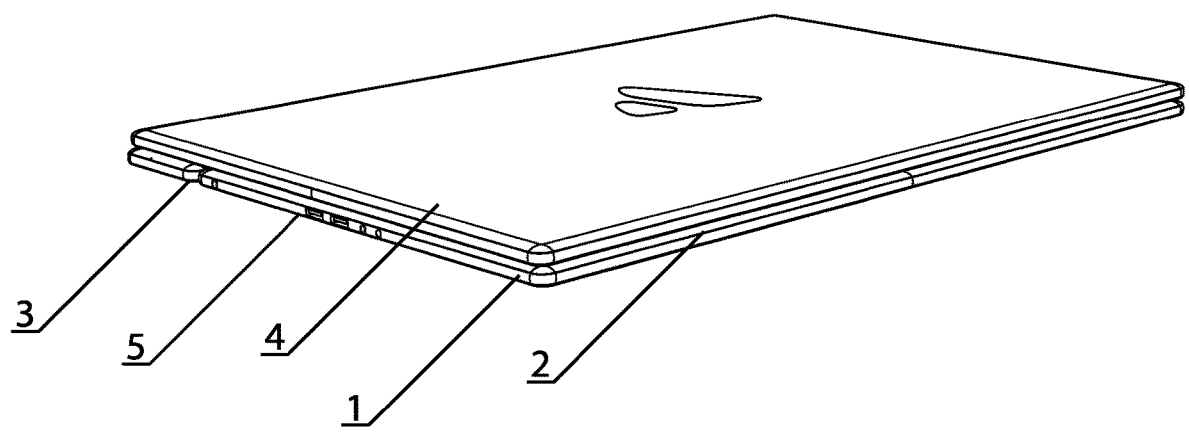
Figure 3:
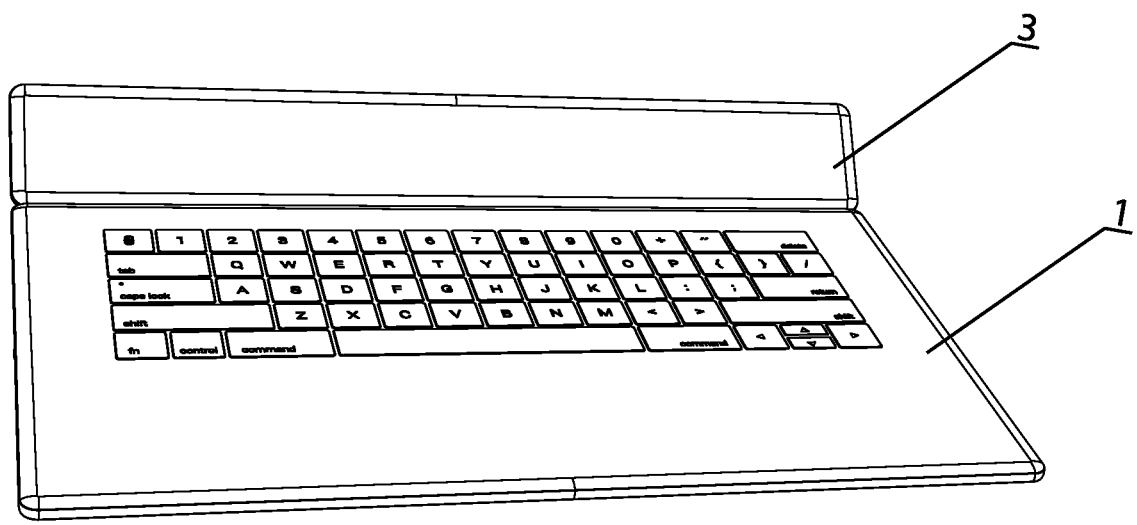

FIG. 1 presents the uncollapsed device in an axonometric view,

FIG. 2 presents the collapsed device in an axonometric view with tablet functions and an additional screen at the back of the display, and FIG. 3 presents the device in an axonometric view with the keyboard and work and navigation panel only.

Embodiment 1

The device that is a laptop consists of two separate workspaces constituting respectively a keyboard 1 and a display 2 with a screen. The third movable workspace is integrated with the keyboard 1 and the display 2, constituting a work and navigation panel 3. The device is made of more than one piece of material. The work and navigation panel 3 has all the functions of a display screen and additionally acts as a touch panel 3.

Embodiment 2

The device that is a laptop consists of two separate workspaces constituting respectively a keyboard 1 and a display 2 with a screen. The third movable workspace is integrated with the keyboard 1 and the display 2, constituting a work and navigation panel 3. The device is made of one piece of material. The work and navigation panel 3 has all the functions of a display screen 2 and additionally acts as a touch panel 3. The device is also equipped with an additional screen 4 on the back of the display 2. The additional screen may be configured to extend, but not limited to, towards a panel 6. The device has a tablet function application installed, which allows, after collapsing (closing) the device, to use the back (outer) touch panel as a tablet. After launching the application, the additional screen 4 displays all tablet functions such as keyboard, start panel, etc. that are ready to use.

Embodiment 3

The device that is a laptop consists of two separate workspaces constituting respectively a keyboard 1 and a display 2 with a screen. The third movable workspace is integrated With the keyboard 1 and the display 2, forming a work and navigation panel 3. The device is made of more than one piece of material. The work and navigation panel 3 has all the functions of a display screen 2 and additionally acts as a touch panel 3, The device is also equipped with an additional screen 4 on the back of the display 2. The additional screen be configured to extend, but not limited to, towards a panel 6. The device (laptop) has a smartphone function application installed, which allows, after collapsing (closing) the device, to use the back (outer) touch panel as a smartphone. After launching the application, the screen 4 displays all smartphone function: keyboard, start panel, call answer button, picture of the caller, phone number, etc. that are ready to use. In a collapsed state the third movable workspace forms one surface with the bottom surface 5 of the keyboard 1.

What is claimed is:

1. A portable device for processing, transmitting and receiving information, sound and video, containing a keyboard and a display that constitute two separate workspaces, wherein the device is equipped with a third movable workspace integrated with the keyboard (1) and the display (2), forming a work and navigation panel (3), wherein the work and navigation panel (3) is disposed between the keyboard (1) and the display (2), wherein the work and navigation panel (3) comprises a first side and a second side opposite the first side, wherein the first side of the work and navigation panel (3) is pivotally connected to the keyboard (1) and the second side of the work and navigation panel (3) is pivotally connected to the display (1), wherein in a collapsed state the work and navigation panel (3) forms one surface with a bottom surface (5) of the keyboard (1), and sum of the size of surface of the keyboard (1) and the work and navigation panel (3) is equal to size of surface of the display (2), wherein the display (2) is removable such that when the display (2) with screens is removed, it is a stand-alone keyboard (1) with a work and navigation panel (3), while maintaining the features of a laptop/computer.

2. The portable device as claimed in claim 1, wherein the device is also equipped with an additional screen (4) on the back of the display (2).

3. The portable device as claimed in claim 1, wherein the device is a laptop or a laptop and tablet or a laptop and smartphone.

4. The portable device as claimed in claim 1, wherein the third movable workspace (3) constitutes a touch panel.

5. The portable device as claimed in claim 1, wherein the keyboard (1) with the work and navigation panel (3) are shaped as a single unit or as two connected elements.

6. The portable device as claimed in claim 1, wherein the keyboard (1) and the work and navigation panel (3) have different surface sizes.

* * * * *